United States Patent
Tsai

(10) Patent No.: US 6,995,815 B2
(45) Date of Patent: Feb. 7, 2006

(54) BACKLIGHT MODULE

(75) Inventor: Yi-Shiuan Tsai, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/778,237

(22) Filed: Feb. 17, 2004

(65) Prior Publication Data

US 2005/0179833 A1    Aug. 18, 2005

(51) Int. Cl.
*G02F 1/1335* (2006.01)

(52) U.S. Cl. .................. 349/70; 362/225; 362/241; 362/245; 362/247

(58) Field of Classification Search .............. 349/68, 349/70; 356/64; 362/184–185, 189–190, 362/29–31, 84, 225, 241, 245, 247; 40/564
See application file for complete search history.

(56) References Cited

U.S. PATENT DOCUMENTS 6,692,137 B2 * 2/2004 Blanchard ............... 362/241
6,800,378 B2 * 10/2004 Hawa et al. ............. 428/688
2002/0044437 A1 * 4/2002 Lee ......................... 362/31
2004/0257792 A1 * 12/2004 Yu et al. .................. 362/31

* cited by examiner

*Primary Examiner*—Tarifur R. Chowdhury
*Assistant Examiner*—Phu Vu
(74) *Attorney, Agent, or Firm*—Rabin & Berdo, P.C.

(57) ABSTRACT

A backlight module is applied in a liquid crystal display with a first panel and an opposite second panel and is disposed between the two panels. The backlight module includes a light box, several light sources, a first optical device and a second optical device. The light box has a first side wall, an opposite second side wall and at least one supporting fixture, and the light sources are disposed therein. Both ends of each supporting fixture are connected to the first side wall and the second side wall respectively; each of the light sources is disposed between two adjacent supporting fixtures. The supporting fixtures disposed between the first optical device and the second optical device keeps the two devices spaced with a substantial equal distance where the two devices are disposed alongside a top surface and a bottom surface of the light box separately.

14 Claims, 5 Drawing Sheets

BACKLIGHT MODULE

BACKGROUND OF THE INVENTION

1. Field of the Invention

The invention relates in general to a backlight module, and more particularly to a direct backlight module applied in a liquid crystal display with two panels.

2. Description of the Related Art

Liquid crystal displays (LCDs) are widely applied in various electrical products such as personal digital assistants (PDAs), notebook computers, digital cameras, digital camcorders, mobile telephones, computer monitors, liquid crystal televisions, and the like because the technology for manufacturing the LCDs is rapidly developed and the LCDs have the advantages of being light, thin, power-saving and radiation-free. Moreover, a LCD with two panels has even more advantages than two LCDs, such as being lighter, thinner and more economical.

FIG. 1 is a schematic sectional view of a conventional LCD with two panels. Referring first to FIG. 1, a liquid crystal display (LCD) 100 at least includes a first panel 110A, a second panel 110B and a backlight module 120. The second panel 110B is disposed opposite to the first panel 110A and the backlight module 120 is disposed between the first panel 110A and the second panel 110B.

The backlight module 120 includes a light box 121, a first optical device 123A, a second optical device 123B and several light sources 122, such as several cold cathode fluorescent lamps (CCFLs). The light sources 122 are disposed within the light box 121. The first optical device 123A is disposed between the light sources 122 and the first panel 110A, and the second optical device 123B is disposed between the light sources 122 and the second panel 110B. The first optical device 123A and the second optical device 123B both include a diffusing sheet and a prism sheet.

However, the impact and the stresses to the light box 121 become higher as LCDs with larger sizes are more widely used. The hanging centers of the first optical device 123A and the second optical device 123B are not properly supported and could sink and deform. Thus, the distance between the first optical device 123A and the second optical device 123B, H, might be different points therebetween, so that the optical quality of the LCD 100 is badly influenced.

SUMMARY OF THE INVENTION

In view of the foregoing, it is an object of the present invention to provide a backlight module applied in a liquid crystal display with a first panel and an opposite second panel. A first optical device and a second optical device of the backlight module can be spaced with an equal distance so that the optical quality of the LCD is improved.

An object of the present invention is to provide a backlight module applied in a liquid crystal display and at least including a light box, several light sources, a first optical device and a second optical device. There are a first panel and an opposite second panel in the liquid crystal display, and the backlight module is disposed between the first panel and the second panel. The light box has a first side wall, an opposite second side wall and at least one supporting fixture. The light sources and the supporting fixtures are disposed within the light box; both ends of each supporting fixture are connected to the first side wall and the second side wall respectively. Each of the light sources is disposed between two adjacent supporting fixtures. The first optical device and the second optical device are disposed alongside a top surface and a bottom surface of the light box respectively. The supporting fixtures disposed between the first optical device and the second optical device keeps the two devices spaced with a substantial equal distance.

Another object of the present invention is to provide a liquid crystal display including a first panel, an opposite second panel and a backlight module. The backlight module is disposed between the first panel and the second panel and includes a light box, several light sources, a first optical device and a second optical device. The light box further has a first side wall, an opposite second side wall and at least one supporting fixture. The supporting fixtures are disposed within the light box and both ends of each supporting fixture are connected to the first side wall and the second side wall respectively. The light sources are disposed within the light box and each of the light sources is disposed between two adjacent supporting fixtures. The first optical device and the second optical device are disposed alongside a top surface and a bottom surface of the light box respectively. The supporting fixtures disposed between the first optical device and the second optical device keeps the two devices spaced with a substantial equal distance.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1:
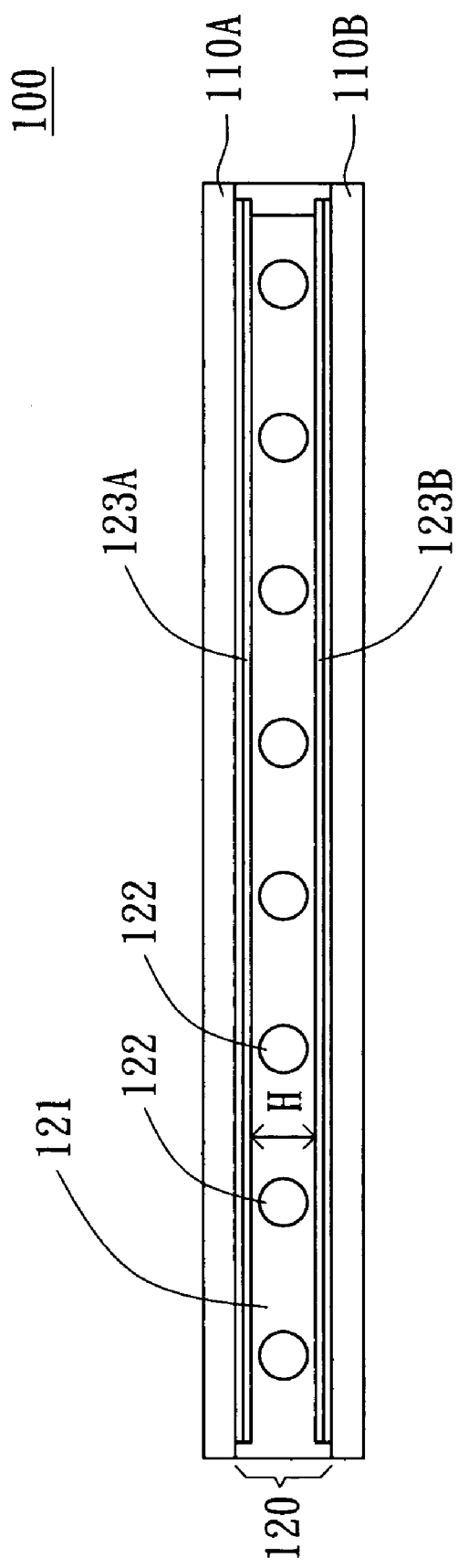
FIG. 1 is a schematic sectional view of a conventional LCD with two panels.
Figure 2:
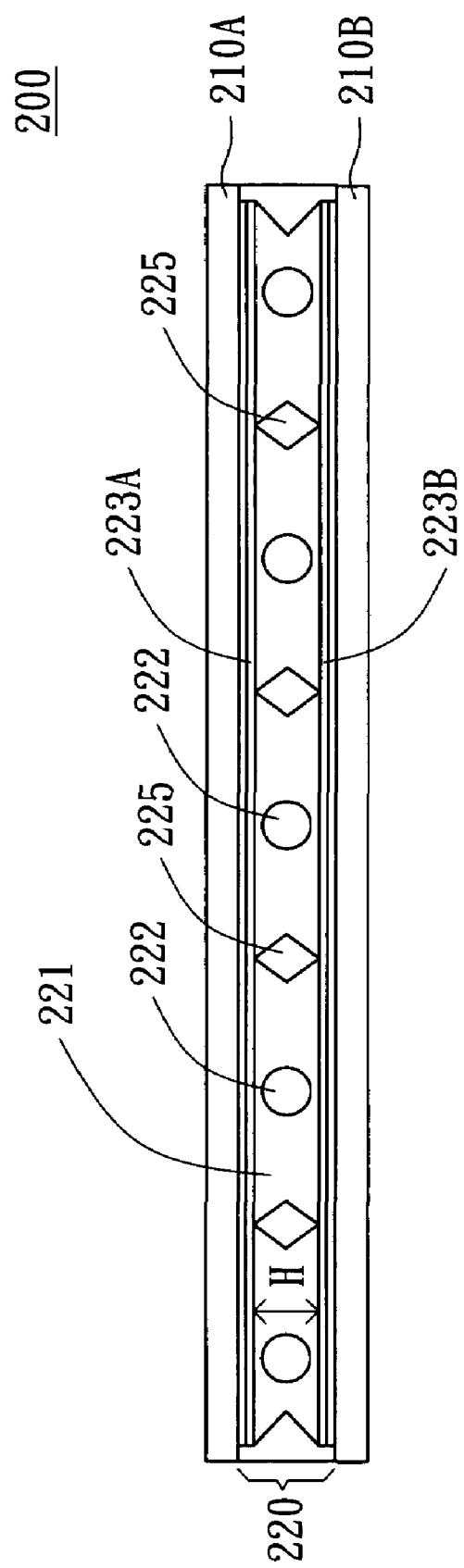
FIG. 2 is a schematic sectional view of a LCD with two panels according to a preferred embodiment of the invention.

FIG. 2 is a schematic sectional view of a LCD with two panels according to a preferred embodiment of the invention. Referring first to FIG. 2, a liquid crystal display 200 at least includes a first panel 210A, a second panel 210B and a backlight module 220. The second panel 210B is disposed opposite to the first panel 210A and the backlight module 220 is disposed between the first panel 210A and the second panel 210B.

The backlight module 220 includes a light box 221, several light sources 222, a first optical device 223A and a second optical device 223B. The light sources 222 are disposed within the light box 221; the light sources 222 are preferably several cold cathode fluorescent lamps (CCFLs).

The first optical device 223A and the second optical device 223B are disposed alongside a top surface and a bottom surface of the light box 221 respectively. In other words, the first optical device 223A is disposed between the light sources 222 and the first panel 210A, and the second optical device 223B is disposed between the light sources 222 and the second panel 210B. The first optical device 223A and the second optical device 223B both preferably include a diffusing sheet and a prism sheet.

Figure 3:
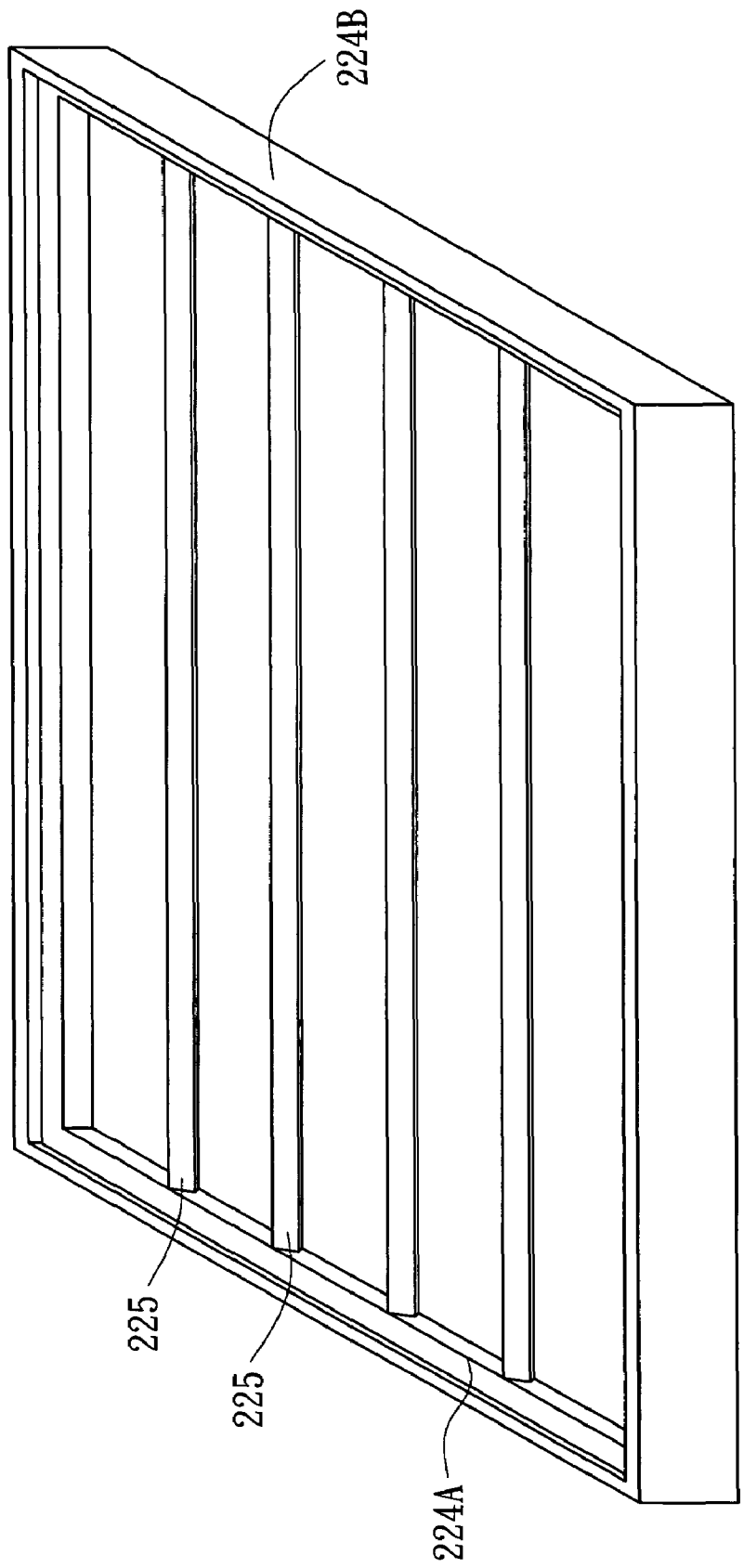
FIG. 3 shows a light box in FIG. 2.

FIG. 3 shows the light box 221 in FIG. 2. Both referring to FIG. 2 and FIG. 3, the light box 221 has a optically-reflective first side wall 224A, a second optically-reflective side wall 224B and at least one supporting fixture 225. Here, four supporting fixtures 225 are preferably as an example of the preferred embodiment. The first side wall 224A is opposite to the second side wall 224B. The supporting fixtures 225 are disposed within the light box 221 and both ends of each supporting fixture 225 are connected to the first side wall 224A and the second side wall 224B respectively. The material of the supporting fixtures 225 is preferably plastic (PC) or polymethylmethacrylic (PMMA). For example, the supporting fixtures 225 could be several plastic blocks with a white-color surface. Also, the cross-section of the supporting fixtures 225 is a substantial rhombus shape and each of the supporting fixtures 225 has a reflecting surface. Each of the light sources 222 is disposed between two adjacent supporting fixtures 225. While the supporting fixtures 225 are between the first optical device 223A and the second optical device 223B, the first optical device 223A and the second optical device 223B can be spaced with an equal distance, H.

Figure 4:
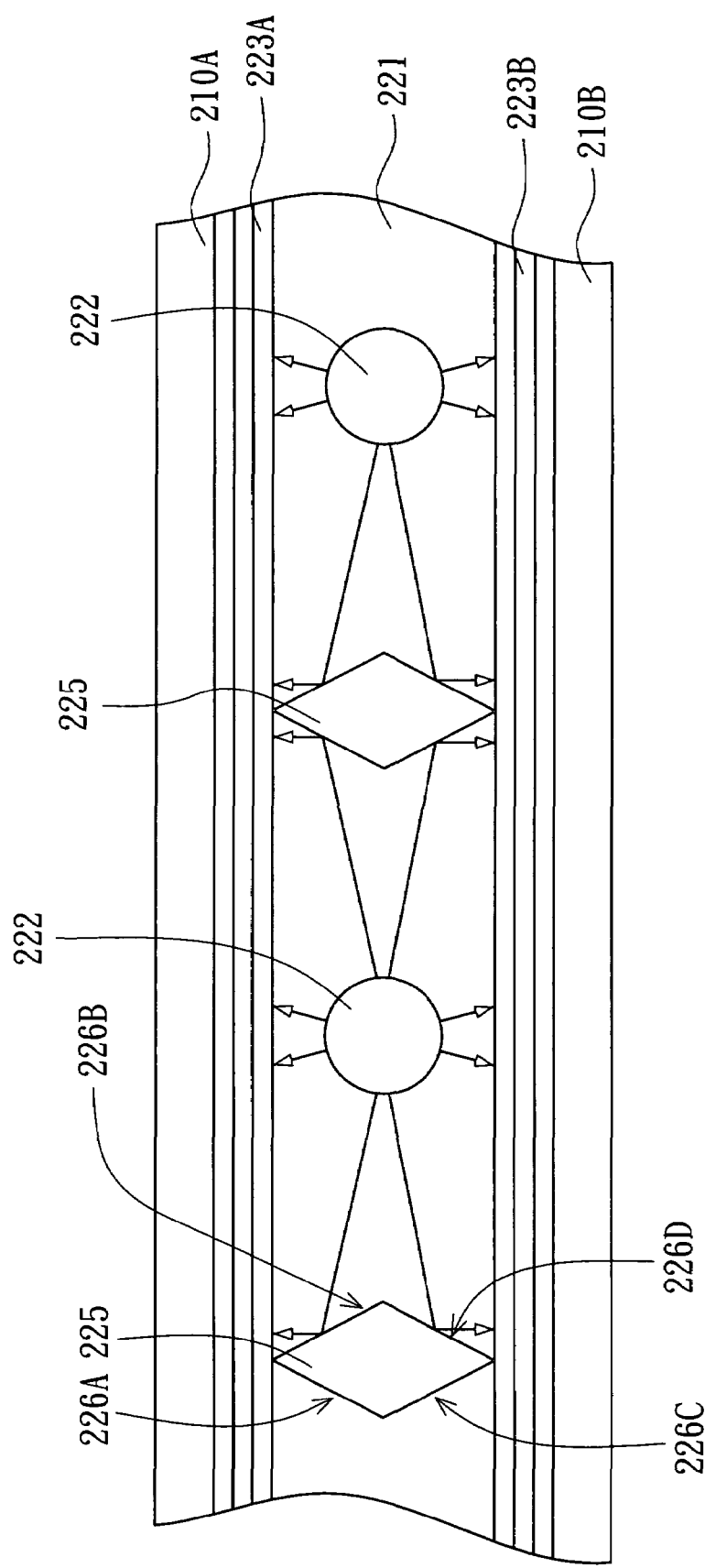
FIG. 4 is an enlarged scale view of portions of FIG. 2.

FIG. 4 is an enlarged scale view of portions of FIG. 2. Referring to FIG. 4, each of the supporting fixtures 225 has four sequential and adjacent optically-reflective curved surfaces: a first curved surface 226A, a second curved surface 226B, a third curved surface 226C and a fourth curved surface 226D. The first curved surface 226A and the second curved surface 226B face the first optical device 223A so that light, emitted from the light sources 222 to the first curved surface 226A and the second curved surface 226B, is guided to the first optical device 223A. Also, the third curved surface 226C and the fourth curved surface 226D face the second optical device 223B, so that light, emitted from the light sources 222 to the third curved surface 226C and the fourth curved surface 226D, is guided to the second optical device 223B.

Figure 6:
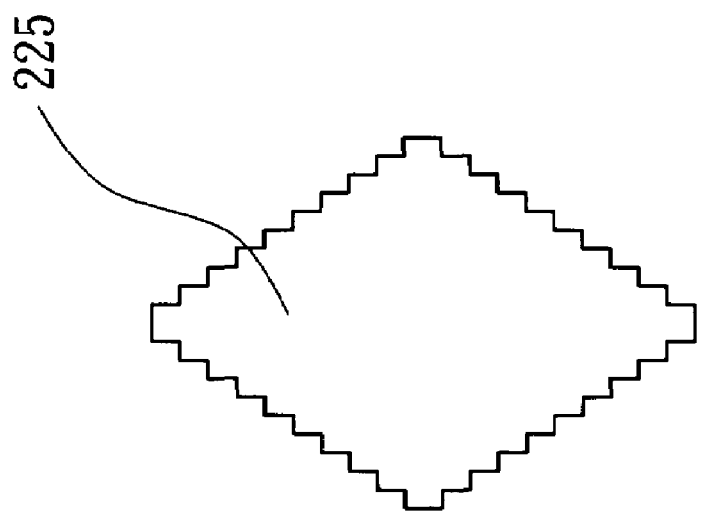
FIG. 6 shows a second example for the cross-section of the supporting fixtures.
Figure 5:
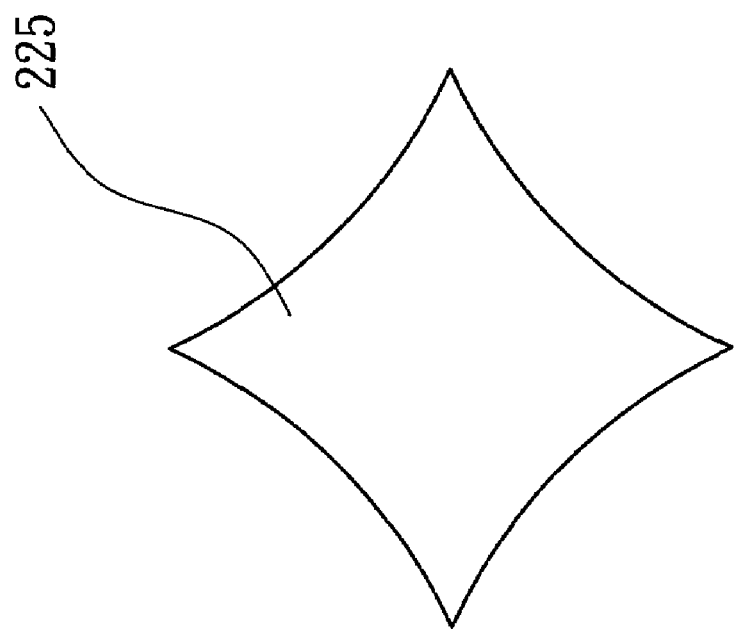
FIG. 5 shows a first example for the cross-section of the supporting fixtures.

However, the present inventions are not limited in what are described above. For example, referring to FIG. 5, it shows a first example for the cross-section of the supporting fixtures 225. Each of the first curved surface 226A, the second curved surface 226B, the third curved surface 226C and the fourth curved surface 226D could be a paraboloid. Also, referring to FIG. 6, it shows a second example for the cross-section of the supporting fixtures 225. The cross-section of the supporting fixtures 225 is a substantial rhombus shape having at least one sawtooth-like edge, and each of the supporting fixtures 225 has a reflecting surface. In addition, it will be understood to one skilled in the art that various shapes of the supporting fixtures 225 can be applied to space the first optical device 223A and the second optical device 223B with a substantial equal distance.

In summary, the backlight module of the present invention at least offers the following advantages: first, the supporting fixtures 225 disposed between the first optical device 223A and the second optical device 223B keeps the two devices spaced with the equal distance, H. As a result, the optical quality of the LCD 200 is improved. Secondly, the reflecting surfaces of the supporting fixtures 225 guide the light, emitted to the first curved surface 226A and the second curved surface 226B, to the first optical device 223A, and also guide the light, emitted to the third curved surface 226C and the fourth curved surface 226D, to the second optical device 223B. As a result, light is focused and less light source 222 is needed.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module applied in a liquid crystal display with a first panel and an opposite second panel, and disposed between the first panel and the second panel, comprising:

a light box having a first side wall, an opposite second side wall and at least one supporting fixture, wherein the at least one supporting fixture is disposed within the light box, both ends of each of the at least one supporting fixture being connected to the first side wall and the second side wall respectively;

a plurality of light sources disposed within the light box, wherein each of the at least one supporting fixture is disposed between two corresponding adjacent light sources; and a first optical device and a second optical device disposed alongside a top surface and a bottom surface of the light box, respectively;

wherein the at least one supporting fixture disposed between the first optical device and the second optical device keeps the two devices spaced with a substantially constant distance, the cross section of the at least one supporting fixture has a substantially rhombus shape and each of the at least one supporting fixture has a reflecting surface.

2. The backlight module according to claim 1, wherein each of the at least one supporting fixtures has a first curved surface, a second curved surface, a third curved surface and a fourth curved surface; the first curved surface and the second curved surface face the first optical device, as well as the third curved surface and the fourth curved surface face the second optical device, so that light, emitted from the light sources to the first curved surface and the second curved surface, is guided to the first optical device and light, emitted from the light sources to the third curved surface and the fourth curved surface, is guided to the second optical device.

3. The backlight module according to claim 2, wherein each of the first curved surface, the second curved surface, the third curved surface and the fourth curved surface is a paraboloid.

4. The backlight module according to claim 1, wherein the cross section of the at least one supporting fixture has a substantially rhombus shape with at least one sawtooth-like edge, and each of the at least one supporting fixtures has a reflecting surface.

5. The backlight module according to claim 1, wherein the material of the at least one supporting fixture is plastic (PC).

6. The backlight module according to claim 1, wherein the at least one supporting fixture is a plastic block with a white-color surface.

7. The backlight module according to claim 1, wherein the material of the at least one supporting fixtures is polymethylmethacrylic (PMMA).

8. A liquid crystal display, comprising:
a first panel and an opposite second panel; and
a backlight module disposed between the first panel and the second panel, wherein the backlight module comprises:
   a light box having a first side wall, an opposite second side wall and at least one supporting fixture, wherein the at least one supporting fixture is disposed within the light box, both ends of each at least one supporting fixture being connected to the first side wall and the second side wall respectively,
   a plurality of light sources disposed within the light box, wherein each of the at least one supporting fixture is disposed between two corresponding adjacent light sources, and
a first optical device and a second optical device disposed alongside a top surface and a bottom surface of the light box, respectively;
   wherein the at least one supporting fixtures disposed between the first optical device and the second optical device keeps the two devices spaced with a substantially constant distance, the cross section of the at least one supporting fixture has a substantially rhombus shape, and each of the at least one supporting fixture has a reflecting surface.

9. The liquid crystal display according to claim 8, wherein each of the at least one supporting fixtures has a first curved surface, a second curved surface, a third curved surface and a fourth curved surface; the first curved surface and the second curved surface face the first optical device, as well as the third curved surface and the fourth curved surface face the second optical device, so that light, emitted from the light sources to the first curved surface and the second curved surface, is guided to the first optical device and light, emitted from the light sources to the third curved surface and the fourth curved surface, is guided to the second optical device.

10. The liquid crystal display according to claim 9, wherein each of the first curved surface, the second curved surface, the third curved surface and the fourth curved surface is a paraboloid.

11. The liquid crystal display according to claim 8, wherein the cross section of the at least one supporting fixture has a substantially rhombus shape with at least one sawtooth-like edge, each of the at least one supporting fixture having a reflecting surface.

12. The liquid crystal display according to claim 8, wherein the material of the at least one supporting fixtures is plastic (PC).

13. The liquid crystal display according to claim 8, wherein the at least one supporting fixture is a plastic block with a white-color surface.

14. The liquid crystal display according to claim 8, wherein the material of the at least one supporting fixtures is PMMA.

* * * * *